(12) United States Patent
Sheik-Nainar et al.

(10) Patent No.: US 10,296,772 B2
(45) Date of Patent: May 21, 2019

(54) BIOMETRIC ENROLLMENT USING A DISPLAY

(71) Applicant: Synaptics Incorporated, San Jose, CA (US)

(72) Inventors: Mohamed Sheik-Nainar, San Jose, CA (US); Eric Faggin, San Jose, CA (US); Justin Mockler, San Jose, CA (US); Harshali Wadge, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 198 days.

(21) Appl. No.: 15/630,754

(22) Filed: Jun. 22, 2017

(65) Prior Publication Data

US 2018/0373917 A1     Dec. 27, 2018

(51) Int. Cl.
*G06K 9/00* (2006.01)
*G06F 16/16* (2019.01)

(52) U.S. Cl.
CPC ..... *G06K 9/00013* (2013.01); *G06K 9/00067* (2013.01); *G06F 16/16* (2019.01)

(58) Field of Classification Search
None
See application file for complete search history.

(56) References Cited

U.S. PATENT DOCUMENTS

| 6,229,906 | B1 | 5/2001 | Pu et al. |
| 7,995,802 | B2 | 8/2011 | Hu et al. |
| 8,311,514 | B2 | 11/2012 | Bandyopadhyay et al. |
| 8,913,801 | B2 | 12/2014 | Han et al. |
| 8,913,802 | B2 * | 12/2014 | Han ................... G06K 9/00013 382/124 |
| 9,201,539 | B2 * | 12/2015 | Hinckley .............. G06F 3/0416 |
| 2009/0083847 | A1 | 3/2009 | Fadell et al. |
| 2009/0226052 | A1 * | 9/2009 | Fedele ............... G06K 9/00046 382/125 |
| 2012/0127179 | A1 * | 5/2012 | Aspelin ................... G06F 21/32 345/441 |
| 2013/0129162 | A1 | 5/2013 | Cheng et al. |

(Continued)

FOREIGN PATENT DOCUMENTS

WO          15142031 A1     9/2015

*Primary Examiner* — Iman K Kholdebarin
(74) *Attorney, Agent, or Firm* — Ferguson Braswell Fraser Kubasta PC

(57) ABSTRACT

A method, system, and non-transitory computer readable medium for in-display fingerprint enrollment that may include receiving an indication to begin a fingerprint enrollment process on an electronic device with an in-display fingerprint sensor; displaying a first fingerprint enrollment shape over the in-display fingerprint sensor; and receiving, in response to displaying the first fingerprint enrollment shape and via a first user interaction, a first portion of fingerprint data. Embodiments may also include generating, in part, a fingerprint coverage map corresponding to the fingerprint using the first portion of the fingerprint data; displaying a second fingerprint enrollment shape over the in-display fingerprint sensor; receiving, in response to displaying the second fingerprint enrollment shape and via a second user interaction, a second portion of fingerprint data; and updating the fingerprint coverage map corresponding to the fingerprint using the second portion of the fingerprint data.

24 Claims, 11 Drawing Sheets

(56) References Cited

U.S. PATENT DOCUMENTS

| | | |
|---|---|---|
| 2013/0135247 A1* | 5/2013 | Na .................... G06F 21/32 |
| | | 345/174 |
| 2013/0159939 A1 | 6/2013 | Krishnamurthi |
| 2013/0257758 A1 | 10/2013 | Huang |
| 2014/0003678 A1* | 1/2014 | Vieta ............... G06K 9/00026 |
| | | 382/124 |
| 2015/0123931 A1* | 5/2015 | Kitchens ............ G06F 3/0414 |
| | | 345/174 |
| 2015/0139511 A1 | 5/2015 | Yoon et al. |
| 2015/0146945 A1* | 5/2015 | Han ................ G06K 9/00033 |
| | | 382/125 |
| 2015/0213244 A1 | 7/2015 | Lymberopoulos et al. |
| 2015/0235098 A1* | 8/2015 | Lee .................. G06K 9/00912 |
| | | 715/709 |
| 2015/0242673 A1 | 8/2015 | Singhal |
| 2015/0324570 A1* | 11/2015 | Lee ...................... G06K 9/3208 |
| | | 382/124 |
| 2016/0026840 A1* | 1/2016 | Li ...................... G06K 9/00013 |
| | | 348/77 |
| 2016/0180145 A1* | 6/2016 | Setterberg .......... G06K 9/00026 |
| | | 382/124 |
| 2016/0180146 A1* | 6/2016 | Setterberg ............ G06F 3/044 |
| | | 382/124 |
| 2016/0246396 A1* | 8/2016 | Dickinson ........... G06F 3/03545 |
| 2018/0276519 A1* | 9/2018 | Benkley, III ......... G06K 9/0002 |

\* cited by examiner

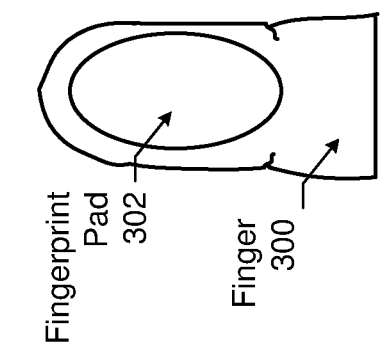
FIG. 3.4
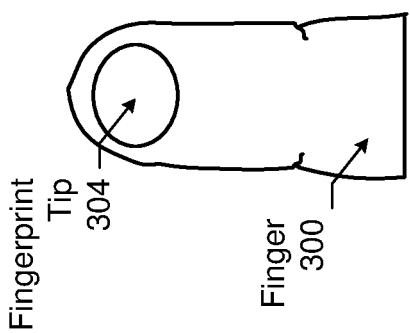
FIG. 3.3
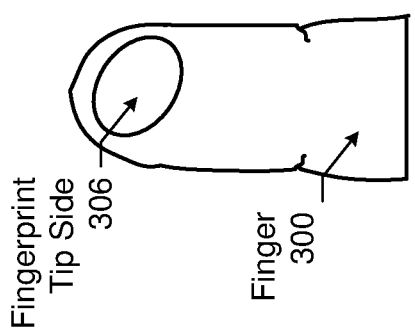
FIG. 3.2
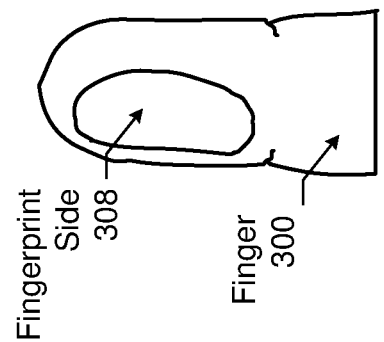
FIG. 3.1

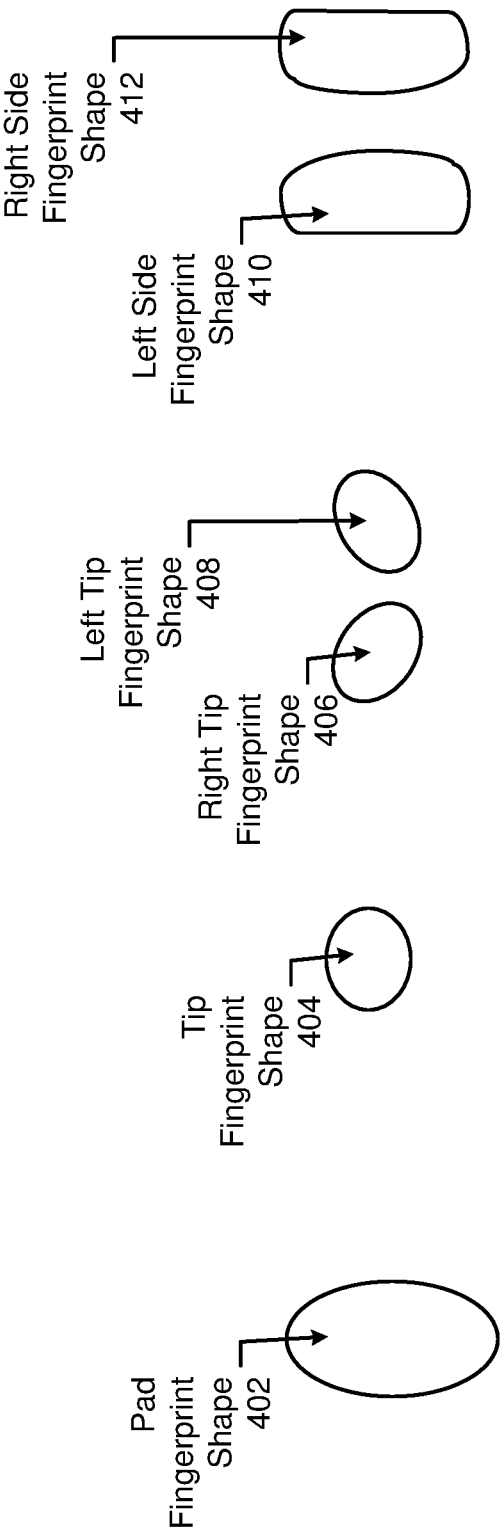

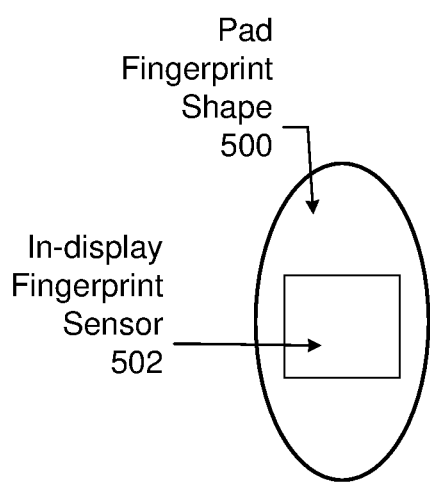 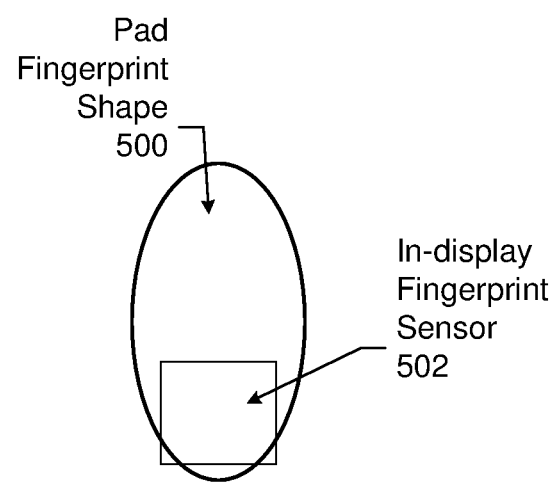
FIG. 5.1          FIG. 5.2

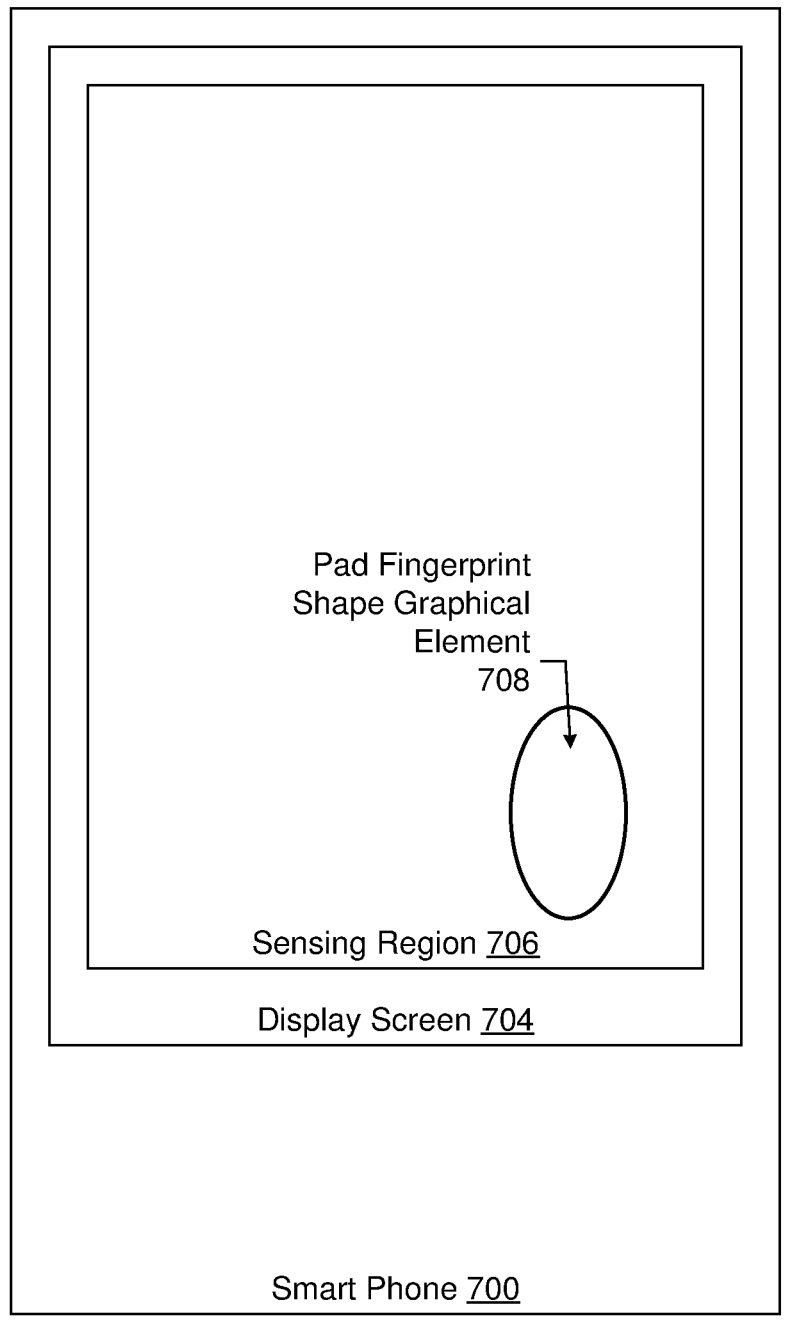
FIG. 7.1

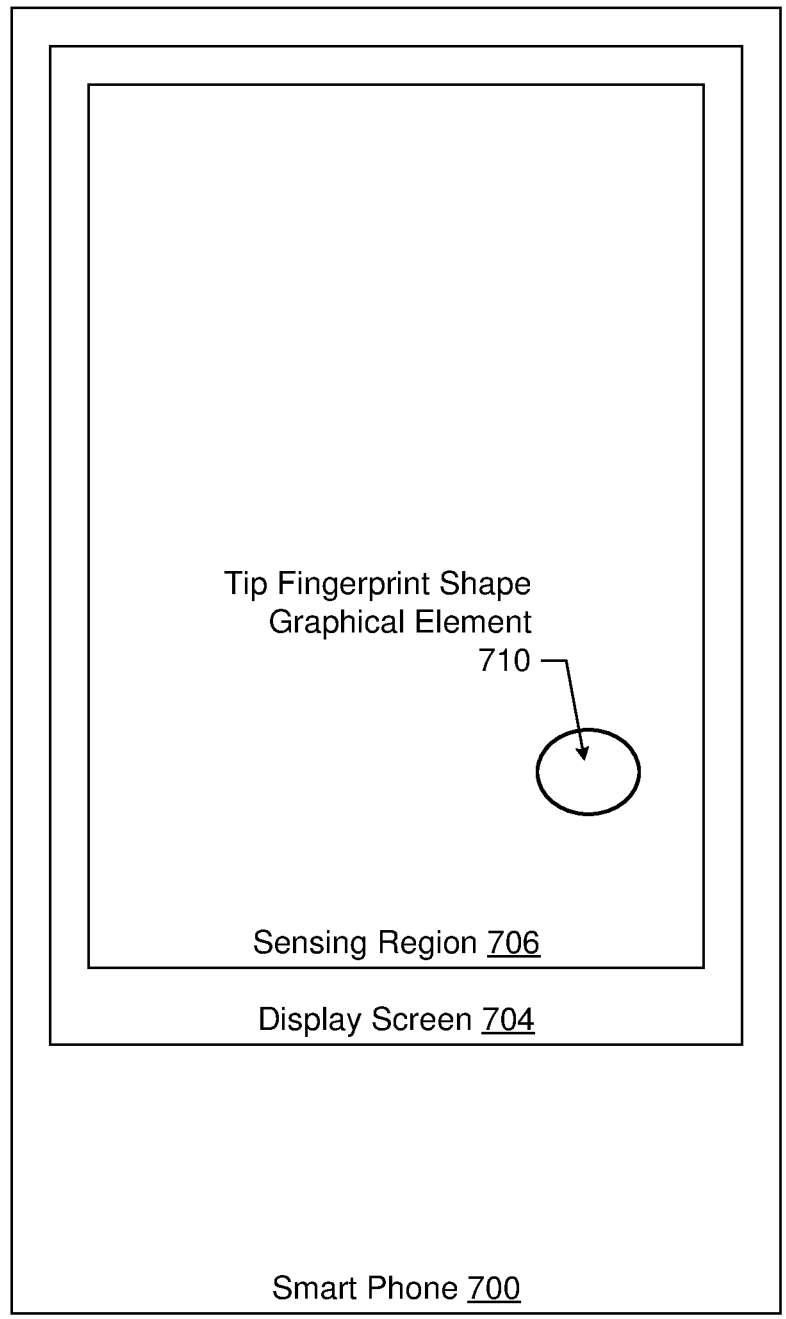
FIG. 7.2

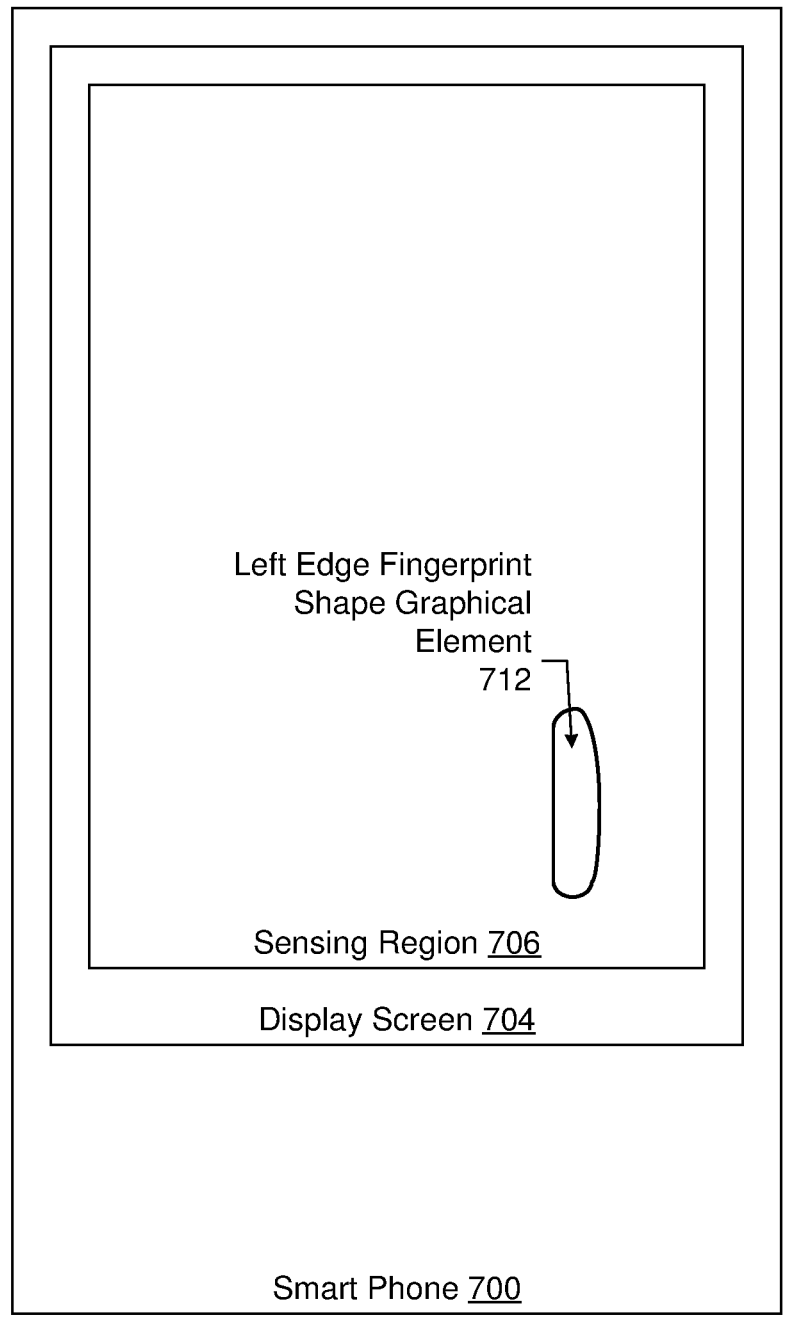
FIG. 7.3

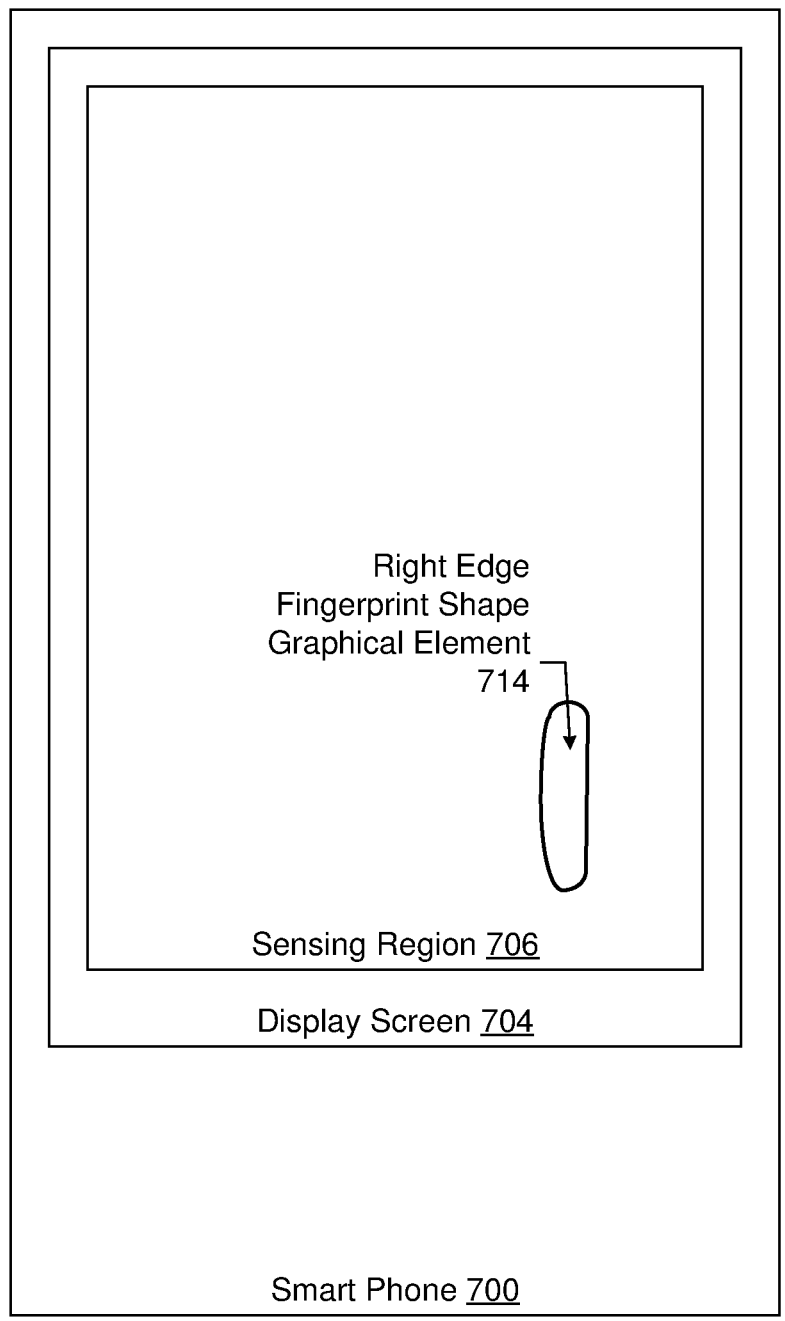
FIG. 7.4

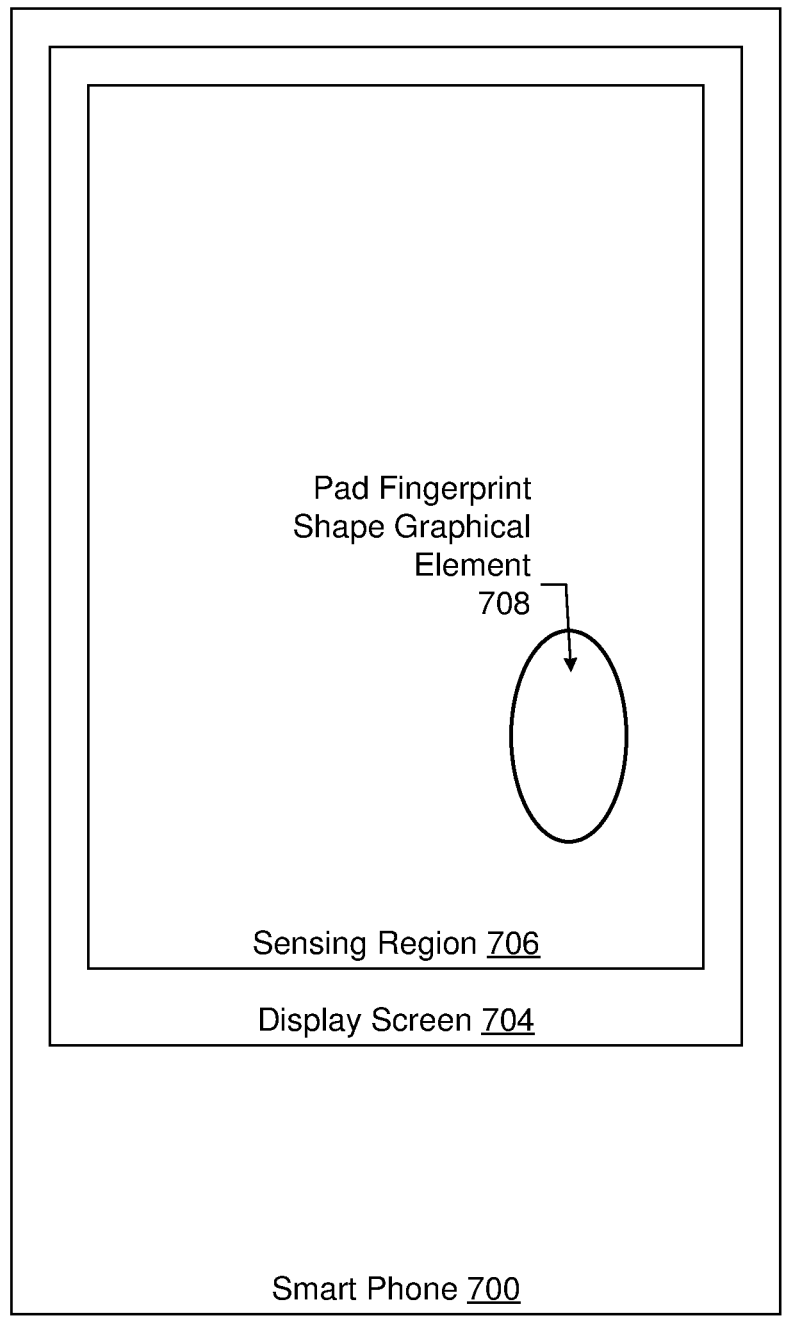
FIG. 7.5

BIOMETRIC ENROLLMENT USING A DISPLAY

FIELD

The disclosed embodiments generally relate to electronic devices, and more particularly to systems and methods for finger capture and enrollment using a display.

BACKGROUND

Biometric devices are used in a variety of electronic systems. A biometric device typically includes a sensing region, often demarked by a surface, in which the biometric device captures biometric data of one or more input objects, such as fingers. Biometric devices may be used to provide interfaces for the electronic system. For example, biometric recognition (or "biometric matching") may be used to enhance security or usability by recognizing discriminatory biometric characteristics of users for purposes of authentication or identification.

Typically, biometric recognition involves comparing biometric input data to enrolled biometric data previously captured during an enrollment process. The quality of the enrollment data affects performance of the biometric recognition system. For example, low quality or incomplete enrollment data can detrimentally impact biometric matching performance by causing false matches (where the system incorrectly determines that the input biometric matches the enrolled biometric) or false non-matches (where the system fails to determine that the input biometric matches the enrolled biometric). Such false matches and/or false non-matches may, in turn, present a security risk or cause frustration to the user.

SUMMARY

In general, in one aspect, embodiments disclosed herein relate to a method for in-display fingerprint enrollment. The method may include receiving an indication to begin a fingerprint enrollment process on an electronic device that includes an in-display fingerprint sensor; displaying, via a display screen of the electronic device, a first fingerprint enrollment shape displayed over the in-display fingerprint sensor of the electronic device; and receiving from a user, in response to displaying the first fingerprint enrollment shape and via a first user interaction with a sensing region overlapping the display screen of the electronic device, a first portion of fingerprint data corresponding to a fingerprint of the user. The method may also include generating, in part, a fingerprint coverage map corresponding to the fingerprint using the first portion of the fingerprint data; displaying, via the display screen of the electronic device, a second fingerprint enrollment shape displayed over the in-display fingerprint sensor; receiving from the user, in response to displaying the second fingerprint enrollment shape and via a second user interaction with the sensing region, a second portion of fingerprint data corresponding to the fingerprint; and updating the fingerprint coverage map corresponding to the fingerprint using the second portion of the fingerprint data.

In general, in one aspect, embodiments disclosed herein relate to an electronic device that includes an in-display fingerprint sensor located within a sensing region overlapping a display screen of the electronic device, coupled to a processing system, and configured to receive fingerprint data via a plurality of user interactions with the sensing region of the electronic device. The electronic device may also include a fingerprint data repository coupled to a processing system and configured to store the fingerprint data and a fingerprint coverage map and the display screen coupled to the processing system. The display screen may be configured to display a first fingerprint enrollment shape over the in-display fingerprint sensor of the electronic device and display a second fingerprint enrollment shape displayed over the in-display fingerprint sensor. The processing system may be configured to receive an indication from a user to begin a fingerprint enrollment process on the electronic device; receive from the user, in response to the display of the first fingerprint enrollment shape and via a first user interaction of the plurality of user interactions, a first portion of the fingerprint data corresponding to a fingerprint of the user; generate, in part, the fingerprint coverage map corresponding to the fingerprint using the first portion of the fingerprint data; receive from the user, in response to the display of the second fingerprint enrollment shape and via a second user interaction of the plurality of user interactions, a second portion of fingerprint data corresponding to the fingerprint; and update the fingerprint coverage map corresponding to the fingerprint using the second portion of the fingerprint data.

In general, in one aspect, embodiments disclosed herein relate to a non-transitory computer readable medium including instructions that, when executed by a computer processor, perform a method. The method may include receiving an indication to begin a fingerprint enrollment process on an electronic device comprising an in-display fingerprint sensor; displaying, via a display screen of the electronic device, a first fingerprint enrollment shape over the in-display fingerprint sensor of the electronic device; and receiving from a user, in response to displaying the first fingerprint enrollment shape and via a first user interaction with a sensing region overlapping the display screen of the electronic device, a first portion of fingerprint data corresponding to a fingerprint of the user. The method may also include generating, in part, a fingerprint coverage map corresponding to the fingerprint using the first portion of the fingerprint data; displaying, via the display screen of the electronic device, a second fingerprint enrollment shape displayed over the in-display fingerprint sensor; receiving from the user, in response to displaying the second fingerprint enrollment shape and via a second user interaction with the sensing region, a second portion of fingerprint data corresponding to the fingerprint; and updating the fingerprint coverage map corresponding to the fingerprint using the second portion of the fingerprint data.

Other aspects will be apparent from the following description and the appended claims.

BRIEF DESCRIPTION OF DRAWINGS

FIG. 3.1, FIG. 3.2, FIG. 3.3, and FIG. 3.4 shows examples of various portions of a finger in accordance with one or more embodiments disclosed herein.

FIG. 4.1, FIG. 4.2, FIG. 4.3, and FIG. 4.4 shows examples of various fingerprint shapes in accordance with one or more embodiments disclosed herein.

FIG. 5.1 and FIG. 5.2 shows examples of various fingerprint sensor locations relative to fingerprint shapes in accordance with one or more embodiments disclosed herein.

FIG. 7.1, FIG. 7.2, FIG. 7.3, FIG. 7.4, and FIG. 7.5 show an example in accordance with an embodiment disclosed herein.

DETAILED DESCRIPTION

Figure 1:
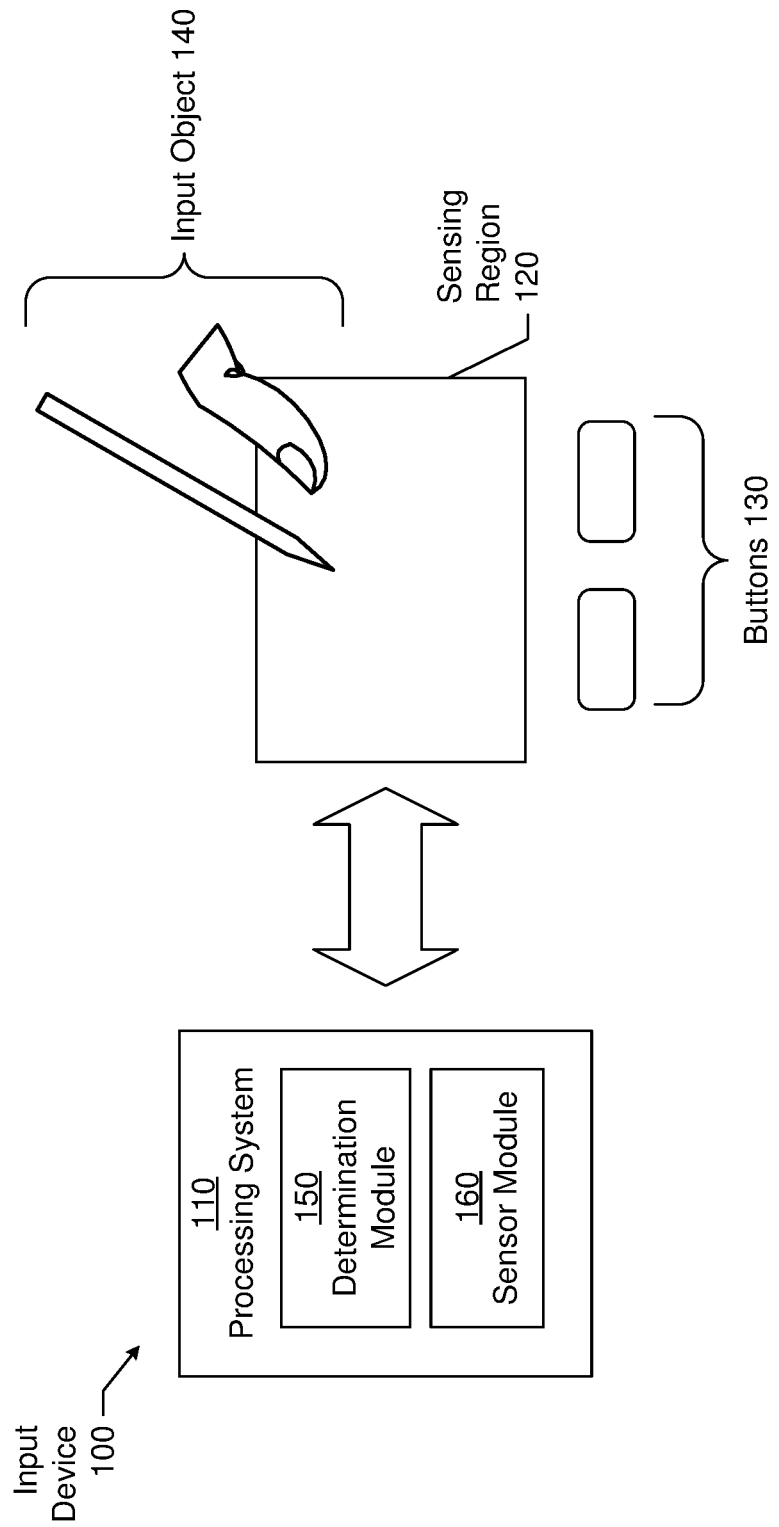
FIG. 1 shows a block diagram of an example system that includes an input device in accordance with an embodiment disclosed herein.

Specific embodiments will now be described in detail with reference to the accompanying figures. Like elements in the various figures are denoted by like reference numerals for consistency.

In the following detailed description of embodiments, numerous specific details are set forth in order to provide a more thorough understanding disclosed herein. However, it will be apparent to one of ordinary skill in the art that the embodiments disclosed herein may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Some embodiments disclosed herein provide input devices and methods that facilitate improved usability. In particular, one or more embodiments disclosed herein provide a user of an electronic device with an improved process for enrolling fingerprints for later use in fingerprint verification to perform certain actions with the electronic device. More specifically, the improved process for enrolling fingerprints may include displaying various shapes corresponding to different portions of a finger over at least a portion of an in-display fingerprint sensor to prompt a user to place a certain portion of a fingerprint over the in-display fingerprint sensor, leading to creation of a more complete fingerprint coverage map for use in fingerprint verification. In one or more embodiments disclosed herein, the display of different shapes over various portions of an in-display fingerprint sensor may increase the visual perception of affordances available to a user of an electronic device during a fingerprint enrollment process.

Turning now to the figures, FIG. 1 is a block diagram of an exemplary input device (100), in accordance with some embodiments disclosed herein. The input device (100) may be configured to provide input to an electronic system (not shown). As used in herein, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device (100) and separate joysticks or key switches. Further example electronic systems include peripherals, such as data input devices (including remote controls, mice, fingerprint sensors, etc.), and data output devices (including display screens and printers). Other examples include remote terminals, kiosks, video game machines (e.g., video game consoles, portable gaming devices, and the like), augmented reality devices, virtual reality devices, wearable devices (e.g., smart watches, smart glasses, etc.), and vehicular devices (e.g., electronic systems within and/or operatively connected to a vehicle). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device (100) may be implemented as a physical part of the electronic system, or may be physically separate from the electronic system. Further, portions of the input device (100) may be part of the electronic system. For example, all or part of a module (e.g., determination module (150)) may be implemented in the device driver of the electronic system. As appropriate, the input device (100) may communicate with parts of the electronic system using any one or more of the following: buses, networks, and other wired or wireless interconnections. Examples include inter-integrated circuit ($I^2C$), serial peripheral interface (SPI) bus, personal system 2 (PS/2), Universal Serial Bus (USB), Bluetooth, radio frequency (RF) connector, and infrared data association (IRDA) connector.

In FIG. 1, the input device (100) is shown as a proximity sensor device (also often referred to as a "touchpad" or a "touch sensor device") configured to sense input provided by one or more input objects (140) in a sensing region (120). Example input objects include fingers and styli, as shown in FIG. 1. Throughout the specification, the singular form of input object may be used. Although the singular form is used, multiple input objects may exist in the sensing region (120). Further, the particular input objects which are found in the sensing region may change over the course of one or more gestures. To avoid unnecessarily complicating the description, the singular form of input object may be used and refers to all of the above variations.

The sensing region (120) encompasses any space above, around, in and/or near the input device (100) in which the input device (100) is able to detect user input (e.g., user input provided by one or more input objects (140)). The sizes, shapes, and locations of particular sensing regions may vary widely from embodiment to embodiment. For example, all or a portion of any sensing region of an input device may include functionality to sense a fingerprint of finger input object touching or proximate to the sensing region.

In some embodiments, the sensing region (120) extends from a surface of the input device (100) in one or more directions into space until signal-to-noise ratios prevent sufficiently accurate object detection. The extension above the surface of the input device may be referred to as the above surface sensing region. The distance to which the sensing region (120) extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device (100), contact with an input surface (e.g. a touch surface) of the input device (100), contact with an input surface of the input device (100) coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region (120) has a rectangular shape when projected onto an input surface of the input device (100).

The input device (100) may utilize any combination of sensor components and sensing technologies to detect user input in the sensing region (120). The input device (100) includes one or more sensing elements for detecting user input. As several non-limiting examples, the input device (100) may use capacitive, elastive, resistive, inductive, magnetic, thermal, acoustic, ultrasonic, force, and/or optical techniques.

Some implementations are configured to provide images that span one, two, three, or higher-dimensional spaces. Some implementations are configured to provide projections of input along particular axes or planes. Further, some implementations may be configured to provide a combination of one or more images and one or more projections.

In some resistive implementations of the input device (100), a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device (100), one or more sensing elements pick up loop currents induced by a resonating coil or pair of coils. Some combination of the magnitude, phase, and frequency of the currents may then be used to determine positional information.

In some optical implementations of the input device (100), one or more sensing elements detect light from the sensing region. The detected light may be reflected from the input object, transmitted through the input object, emitted by input object, or some combination thereof. The detected light may be in the visible or invisible spectrum (such as infrared or ultraviolet light). Example optical sensing elements include photodiodes, complementary metal oxide semiconductor (CMOS) image sensor arrays, charge coupled device (CCD) arrays, thin-film detectors, and other suitable photosensors sensitive to light in wavelength(s) of interest. Active illumination may be used to provide light to the sensing region, and reflections from the sensing region in the illumination wavelength(s) may be detected to determine input information corresponding to the input object. In some embodiments, a display and/or one or more discrete light sources (e.g., dedicated LEDs) are used as an active illumination source for optical sensing.

One example optical technique utilizes direct illumination of the input object, which may or may not be in contact with an input surface of the sensing region depending on the configuration. One or more light sources and/or light guiding structures are used to direct light to the sensing region. When an input object is present, such light is reflected directly from surfaces of the input object, which reflections can be detected by the optical sensing elements and used to determine input information about the input object.

Another example optical technique utilizes indirect illumination based on internal reflection to detect input objects in contact with an input surface of the sensing region. One or more light sources are used to direct light in a transmitting medium at an angle at which it is internally reflected at the input surface of the sensing region, due to different refractive indices at opposing sides of the interface defined by the input surface. Contact of the input surface by the input object causes the refractive index to change across the boundary defined by the interface, which alters the internal reflection characteristics at the input surface. Higher contrast signals can often be achieved if principles of frustrated total internal reflection (FTIR) are used to detect the input object, where the light is directed to the input surface at an angle of incidence at which it is totally internally reflected, except at locations where the input object is in contact and causes the light to scatter and partially transmit across the interface at the region of contact by the input object. An example of such a region of contact is a presence of a finger introduced to an input surface defined by a glass to air interface. The higher refractive index of human skin compared to air causes light incident at the input surface at the critical angle of the interface to air to be partially transmitted across the input interface and scattered by the finger, where it would otherwise be totally internally reflected at the glass to air interface. Such an optical response can be detected by the system and used to determine spatial information. In some embodiments, spatial information may be used to image small scale surface variations of the input object, such as fingerprint patterns, where the internal reflectivity of the incident light differs depending on whether a ridge or valley of the finger is in contact with that portion of the input surface.

In some acoustic implementations of the input device (100), one or more acoustic sensing elements detect sound waves from nearby input objects. The sound waves may be in audible frequencies or ultrasonic frequencies. The detected sound waves may include echoes of ambient sound waves and/or echoes of sound waves emitted by the input device that are reflected from surfaces of the input object. Some combination of the amplitude, phase, frequency, and or time delay of the electrical signals may be used to determine spatial information corresponding to the input object.

One exemplary acoustic sensing technique utilizes active ultrasonic sensing to emit high frequency source waves that propagate to the sensing region. One or more ultrasonic transmitter elements (also "ultrasonic emitters") may be used to emit high frequency sound waves to the sensing region, and one or more ultrasonic receiving elements (also "ultrasonic receivers") may detect echoes of the emitted sound waves. Separate elements may be used to transmit and receive, or individual elements that both transmit and receive may be used (e.g., ultrasonic transceivers). In one implementation, an acoustic pulse is emitted and reflected at the interface corresponding to the input surface. The acoustic impedance at the interface differs depending on whether a ridge or valley of a finger is in contact with that portion of the input surface, affecting the intensity of the detected waves reflected back from the input surface. In some embodiments, emitted ultrasonic waves are able to penetrate sub-surfaces of the input object, such as dermal layers of a human finger.

In some capacitive implementations of the input device (100), voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self-capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g., system ground), and by detecting the capacitive coupling between the sensor electrodes and input objects. The reference voltage may be a substantially constant voltage or a varying voltage. In various embodiments the reference voltage may be system ground. Measurements acquired using absolute capacitance sensing methods may be referred to as absolute capacitive measurements.

Some capacitive implementations utilize "mutual capacitance" (or "trans capacitance") sensing methods based on changes in the capacitive coupling between sensor electrodes. In various embodiments, an input object near the sensor electrodes alters the electric field between the sensor electrodes, thus changing the measured capacitive coupling. In one implementation, a mutual capacitance sensing method operates by detecting the capacitive coupling between one or more transmitter sensor electrodes (also "transmitter electrodes" or "transmitter") and one or more receiver sensor electrodes (also "receiver electrodes" or "receiver"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. The reference voltage may be a substantially constant voltage and, in various embodiments, the reference voltage may be system ground. In some embodiments, transmitter sensor electrodes may both be modulated. The transmitter electrodes are modulated relative to the receiver electrodes to transmit transmitter signals and to facilitate receipt of resulting signals. A resulting signal may include effect(s) corresponding to one or more transmitter signals, and/or to one or more sources of environmental interference (e.g., other electromagnetic signals). The effect(s) may be the transmitter signal, a change in the transmitter signal caused by one or more input objects and/or environmental interference, or other such effects. Sensor electrodes may be dedicated transmitters or receivers, or may be configured to both transmit and receive. Measurements acquired using mutual capacitance sensing methods may be referred to as mutual capacitance measurements.

Further, the sensor electrodes may be of varying shapes and/or sizes. The same shapes and/or sizes of sensor electrodes may or may not be in the same groups. For example, in some embodiments, receiver electrodes may be of the same shapes and/or sizes while, in other embodiments, receiver electrodes may be varying shapes and/or sizes. In one or more embodiments disclosed herein, at least a portion of the electrodes are arranged in an array to form a fingerprint sensor within the sensing region, which may be within a display screen of an electronic device. In such embodiments, the array may include any number of electrodes and/or other sensing elements arranged in any pattern, size, and/or resolution. As a non-limiting example, electrodes for in-display fingerprint sensing may be arranged in a grid that is sixteen electrodes by sixteen electrodes, 50 electrodes by 100 electrodes, etc. As another non-limiting example, a fingerprint sensor may have an area size between 10 mm$^2$ and 100 mm$^2$ As still another non-limiting example, the resolution of a fingerprint sensor may be between 350 and 2000 pixels/dots per inch (ppi/dpi).

In FIG. 1, a processing system (110) is shown as part of the input device (100). The processing system (110) is configured to operate the hardware of the input device (100) to detect input in the sensing region (120). The processing system (110) includes parts of, or all of, one or more integrated circuits (ICs) and/or other circuitry components. For example, a processing system for a mutual capacitance sensor device may include transmitter circuitry configured to transmit signals with transmitter sensor electrodes, and/or receiver circuitry configured to receive signals with receiver sensor electrodes. Further, a processing system for an absolute capacitance sensor device may include driver circuitry configured to drive absolute capacitance signals onto sensor electrodes, and/or receiver circuitry configured to receive signals with those sensor electrodes. In one or more embodiments, a processing system for a combined mutual and absolute capacitance sensor device may include any combination of the above described mutual and absolute capacitance circuitry. In some embodiments, the processing system (110) also includes electronically-readable instructions, such as firmware code, software code, a computer program product, and/or the like.

In some embodiments, components composing the processing system (110) are located together, such as near sensing element(s) of the input device (100). In other embodiments, components of processing system (110) are physically separate with one or more components close to the sensing element(s) of the input device (100), and one or more components elsewhere. For example, the input device (100) may be a peripheral coupled to a computing device, and the processing system (110) may include software configured to run on a central processing unit of the computing device and one or more ICs (perhaps with associated firmware) separate from the central processing unit.

As another example, the input device (100) may be physically integrated in a mobile device, and the processing system (110) may include circuits and firmware that are part of a main processor of the mobile device. In some embodiments, the processing system (110) is dedicated to implementing the input device (100). In other embodiments, the processing system (110) also performs other functions, such as operating display screens, driving haptic actuators, receiving and processing measurements related to the input device (e.g., resistances, voltages, currents, etc.), enrolling and verifying fingerprints, etc.

The processing system (110) may be implemented as a set of modules that handle different functions of the processing system (110). Each module may include circuitry that is a part of the processing system (110), firmware, software, and/or a combination thereof. In various embodiments, modules may be standalone modules, or may be implemented as various combinations of modules. Any one or more modules may be linked to any one or more other modules, with such links allowing the modules to function together to form a system.

As a non-limiting example, a module or set of modules (e.g., processing system (110)), as used herein, may include software written in any programming language, which may be stored on volatile and/or non-volatile memory. Such software, when executed, may lead, directly (e.g., via compilation) or indirectly (e.g., via interpretation), to the generation of machine code (e.g., binary numbers such as 11010101) used as input to at least a portion of the integrated circuitry of one or more processors. Input of machine code to the processor(s) may cause various effects within the circuitry of the processor(s), with such effects implementing at least a portion of the programming language source code from which the machine code was derived. Examples of such effects include, but are not limited to: biasing a transistor to allow current flow or not; creating connections between various portions of the circuitry; causing current to flow through various portions of circuitry; causing the voltage across a circuit element to change; etc. Said another way, as used herein, a module configured to perform certain functionality should be understood to include software and/or firmware, as well as at least a portion of the underlying computing hardware on which the software executes.

For example, as shown in FIG. 1, the processing system (110) may include a determination module (150) and a sensor module (160). The determination module (150) may include functionality to determine when at least one input object is in a sensing region, determine signal to noise ratio, determine positional information of an input object, identify a gesture, determine an action to perform based on the gesture, a combination of gestures or other information, determine if a fingerprint is an enrolled fingerprint, and/or perform other operations.

The sensor module (160) may include functionality to drive the sensing elements to transmit transmitter signals and receive the resulting signals. For example, the sensor module (160) may include sensory circuitry that is coupled to the sensing elements. The sensor module (160) may include, for example, a transmitter module and a receiver module. The transmitter module may include transmitter circuitry that is coupled to a transmitting portion of the sensing elements. The receiver module may include receiver circuitry coupled to a receiving portion of the sensing elements and may include functionality to receive the resulting signals.

Although FIG. 1 shows only a determination module (150) and a sensor module (160), alternative or additional modules may exist in accordance with one or more embodiments disclosed herein. Such alternative or additional modules may correspond to distinct modules, or to sub-modules of one or more of the modules discussed above. Example alternative or additional modules include hardware operation modules for operating hardware such as: sensor electrodes; haptic actuator components; fingerprint sensors; display screens; data processing modules for processing data such as sensor signals and positional information; reporting modules for reporting information, and identification modules configured to identify gestures, such as mode changing gestures, and mode changing modules for changing operation modes. Further, the various modules may be combined in separate integrated circuits. For example, a first module may be comprised at least partially within a first integrated circuit and a separate module may be comprised at least partially within a second integrated circuit. Further, portions of a single module may span multiple integrated circuits. In some embodiments, the processing system as a whole may perform the operations of the various modules.

In some embodiments, the processing system (110) responds to user input (or lack of user input) in the sensing region (120) directly by causing one or more actions. Example actions include locking or unlocking access to a device, transitioning a display screen to an active or inactive state, maintaining an active state of a display screen, changing operation modes, as well as graphical user interface (GUI) actions such as cursor movement, selection, menu navigation, haptic actuation, and other functions. In some embodiments, the processing system (110) provides information about the input (or lack of input) to some part of the electronic system (e.g. to a central processing system of the electronic system that is separate from the processing system (110), if such a separate central processing system exists). In some embodiments, some part of the electronic system processes information received from the processing system (110) to act on user input, such as to facilitate a full range of actions, including mode changing actions and GUI actions.

For example, in some embodiments, the processing system (110) operates the sensing element(s) of the input device (100) to produce electrical signals indicative of input (or lack of input) in the sensing region (120). The processing system (110) may perform any appropriate amount of processing on the electrical signals in producing the information provided to the electronic system. For example, the processing system (110) may digitize analog electrical signals obtained from the sensor electrodes or other modules. As another example, the processing system (110) may perform filtering or other signal conditioning. As yet another example, the processing system (110) may subtract or otherwise account for a baseline, such that the information reflects a difference between the electrical signals and the baseline. As yet further examples, the processing system (110) may determine positional information, recognize inputs as commands, recognize handwriting, recognize enrolled fingerprints, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device (100) is implemented with additional input components that are operated by the processing system (110) or by some other processing system. These additional input components may provide redundant functionality for input in the sensing region (120), or some other functionality. FIG. 1 shows buttons (130) near the sensing region (120) that may be used to facilitate selection of items using the input device (100). Other types of additional input components include sliders, balls, wheels, switches, and the like. Conversely, in some embodiments, the input device (100) may be implemented with no other input components.

In some embodiments, the input device (100) includes a sensing region (120) that overlaps at least part of an active area of a display screen. As used herein, the term overlaps or overlapping refer to at least a partial alignment of two or more components, which may occur in any order. As such, when a first component and a second component are overlapping, either component may be closer to the surface of a touch screen interface or other portion of an electronic device. For example, the input device (100) may include substantially transparent sensor electrodes overlaying the display screen and providing a touch screen interface for the associated electronic system and/or a fingerprint sensor implemented within the touch screen region. As another example, the input device (100) may include light sensitive elements underlying a transparent or semitransparent display, or in a common plane with a thin film transistor (TFT) backplane for driving a display.

It should be understood that while many embodiments disclosed herein are described in the context of a fully-functioning apparatus, the mechanisms of the embodiments disclosed herein are capable of being distributed, at least partially, as a program product (e.g., software) in a variety of forms. For example, the mechanisms disclosed herein may be implemented and distributed as a software program on information-bearing media that are readable by electronic processors (e.g., non-transitory computer-readable and/or recordable/writable information bearing media that is readable by the processing system (110)).

Additionally, the embodiments disclosed herein apply equally regardless of the particular type of medium used to carry out the distribution. For example, software instructions in the form of computer readable program code to perform embodiments disclosed herein may be stored, in whole or in part, temporarily or permanently, on a non-transitory computer-readable storage medium. Examples of non-transitory, electronically-readable media include various discs, physical memory, memory, memory sticks, memory cards, memory modules, and or any other computer readable storage medium. Electronically-readable media may be based on flash, optical, magnetic, holographic, or any other storage technology.

Although not shown in FIG. 1, the processing system, the input device, and/or the host system may include one or more computer processor(s), associated memory (e.g., random access memory (RAM), cache memory, flash memory, etc.), one or more storage device(s) (e.g., a hard disk, an optical drive such as a compact disk (CD) drive or digital versatile disk (DVD) drive, a flash memory stick, etc.), and numerous other elements and functionalities. The computer processor(s) may be one or more integrated circuits for processing instructions. For example, the computer processor(s) may be one or more cores or micro-cores of a processor. Further, one or more elements of one or more embodiments may be located at a remote location and connected to the other elements over a network. Further, embodiments disclosed herein may be implemented on a distributed system having several nodes, where each portion disclosed herein may be located on a different node within the distributed system. In one embodiment disclosed herein, the node corresponds to a distinct computing device. Alternatively, the node may correspond to a computer processor with associated physical memory. The node may alternatively correspond to a computer processor or micro-core of a computer processor with shared memory and/or resources.

While FIG. 1 shows a configuration of components, other configurations may be used without departing from the scope disclosed herein. For example, various components may be combined to create a single component. As another example, the functionality performed by a single component may be performed by two or more components. Accordingly, the embodiments disclosed herein should not be limited to the configuration of components shown in FIG. 1.

Figure 2:
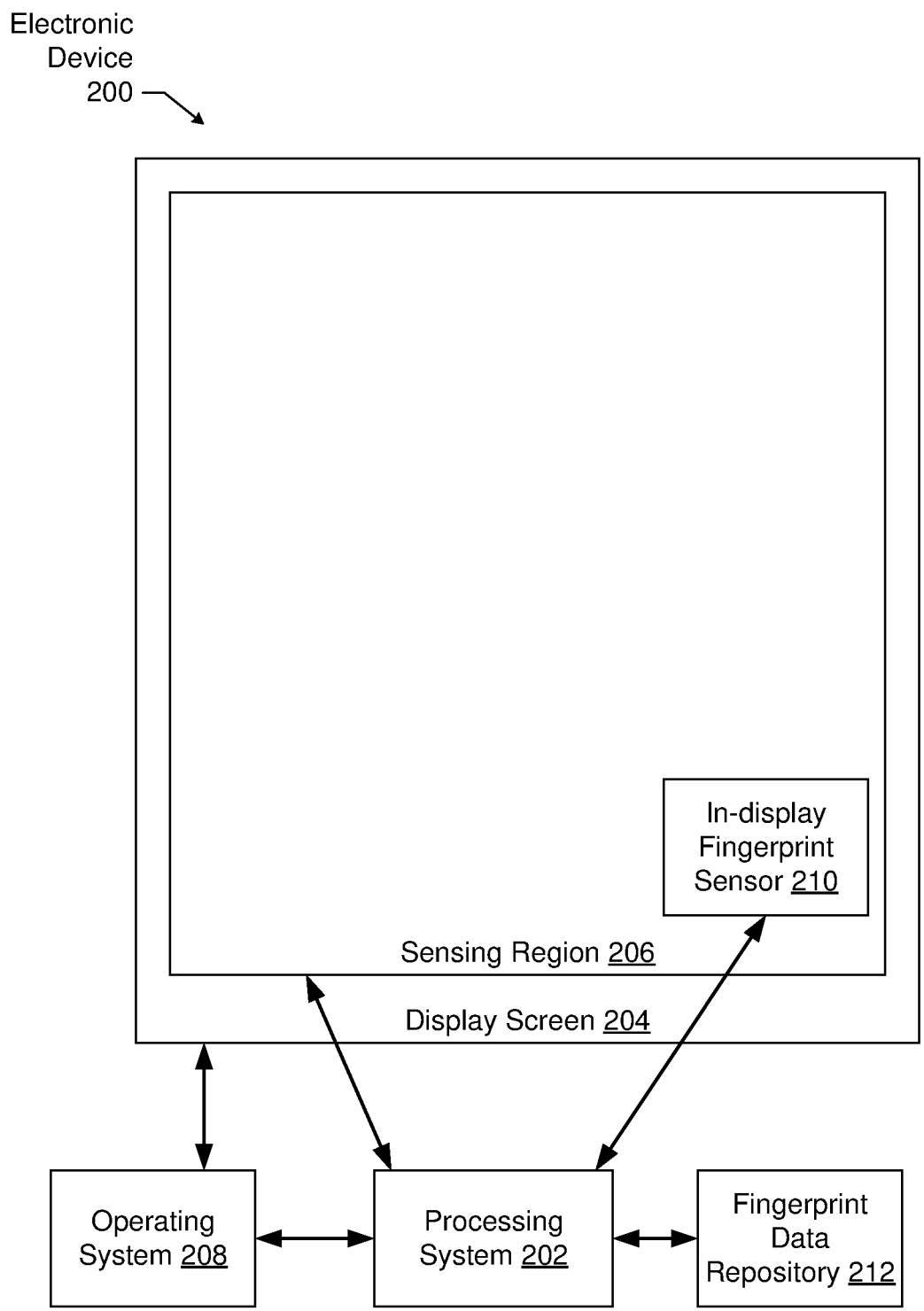
FIG. 2 shows a block diagram of an example system in accordance with an embodiment disclosed herein.

FIG. 2 shows an electronic device (200) in accordance with one or more embodiments disclosed herein. As shown in FIG. 2, the electronic device (200) includes an in-display fingerprint sensor (210), a display screen (204), a sensing region (206), a processing system (202), a fingerprint data repository (212), and an operating system (208). Each of these components is described below.

In one or more embodiments disclosed herein, the in-display fingerprint sensor (210) is any sensor capable of detecting the presence of a fingerprint in a sensing region (206). In one or more embodiments disclosed herein, the sensing region (206) is substantially similar to the sensing region (120) discussed above in the description of FIG. 1. As used herein, fingerprint means a pattern formed by ridges on the surface of the skin of a finger or thumb. In one or more embodiments disclosed herein, the in-display fingerprint sensor (210) may be hardware (e.g., circuitry) with or without accompanying software, firmware, etc. In one or more embodiments disclosed herein, an in-display fingerprint sensor may be located anywhere within all or a portion of the sensing region (206) overlapping a display screen (204) of an electronic device (200), For example, the in-display fingerprint sensor may be located where it has been empirically determined a large number of users are comfortable placing their fingers when manipulating the touch screen interface of the electronic device (200).

An in-display fingerprint sensor (210) may detect the presence of a fingerprint using any method. Examples of such a method include, but are not limited to, optical fingerprint sensing, capacitive fingerprint sensing, and ultrasonic fingerprint sensing. An optical fingerprint sensor may capture an image of a fingerprint using light. A capacitive fingerprint sensor may include any number of electrodes and may use either mutual or absolute capacitance (described above) to form a capacitive image of a fingerprint. An ultrasonic fingerprint sensor may use high-frequency waves to create an ultrasonic image of a layer underneath the surface skin of a finger that includes the same or similar pattern as the fingerprint. The aforementioned types of fingerprint sensors may be implemented within the sensing region corresponding to a display screen (204) and, as such, may utilize a portion of the hardware (e.g., electrodes) corresponding to the sensing region (206) and/or be implemented as one or more layers above and/or below the display screen.

An in-display fingerprint sensor (210) may detect a fingerprint that a user places over the sensor, and/or may detect a fingerprint that is swiped over the sensor. The finger for which a fingerprint is being detected may or may not come into actual contact with the fingerprint sensor (i.e., the fingerprint may be proximate to the sensor without actually touching the sensor). As an example, a user may actually touch a target displayed at least partially over an in-display fingerprint sensor. In one or more embodiments disclosed herein, an in-display fingerprint sensor (210) is located anywhere within the sensing region (206) overlaying a display screen (204) of an electronic device (200). As an example of such an embodiment, the in-display fingerprint sensor (210) may be an array of electrodes or other sensing elements of any size and/or quantity that is located in, on, over, and/or under a portion of a smart phone (i.e., an electronic device (200)), such as a display screen (204).

In one or more embodiments disclosed herein, the in-display fingerprint sensor (210) is operatively connected to a processing system (202). In one or more embodiments disclosed herein, the processing system (202) is substantially similar to the processing system (110) discussed above in the description of FIG. 1. As such, in one or more embodiments disclosed herein, the processing system (202) includes parts of, or all of, one or more integrated circuits (ICs) and/or other circuitry components and the capability to use said circuitry for the execution of software and/or firmware to perform at least a portion of the functionality described herein.

In one or more embodiments disclosed herein, the processing system (202) includes functionality to receive information from the in-display fingerprint sensor (210) and process the information for storage (e.g., during a fingerprint enrollment process) and/or to determine whether or not a finger, and corresponding fingerprint, is interacting (e.g., in contact with or proximate to) with the in-display fingerprint sensor. In one or more embodiments disclosed herein, if a finger is determined to be interacting with the in-display fingerprint sensor, the processing system (202) includes functionality to process data corresponding to the fingerprint of the finger to store fingerprint data in a fingerprint data repository as enrolled fingerprint data and/or detect that the fingerprint is an enrolled fingerprint based on a comparison with fingerprint data already in a fingerprint data repository (212).

In one or more embodiments disclosed herein, the processing system (202) is operatively connected to the aforementioned fingerprint data repository (212). In one or more embodiments disclosed herein, the fingerprint data repository (212) is any type of storage unit and/or device (e.g., a file system, database, collection of tables, or any other storage mechanism) for storing data. Further, the fingerprint data repository (212) may include multiple different storage units and/or devices. The multiple different storage units and/or devices may or may not be of the same type or located at the same physical site.

In one or more embodiments disclosed herein, the fingerprint data repository (212) includes functionality to store fingerprint data corresponding to any number of individual fingerprints from any number of users of an electronic device (200) with an in-display fingerprint sensor (210). In one or more embodiments disclosed herein, the fingerprint data stored in the fingerprint data repository (212) corresponds to any number of fingerprints enrolled via an enrollment process. In one or more embodiments disclosed herein, an enrollment process is any process by which a user of an electronic device (200) including or otherwise coupled to an in-display fingerprint sensor (210) provides fingerprint data, via the fingerprint sensor, to the electronic device to be stored for use in future fingerprint verification.

For example, various shapes may be displayed over at least a portion of an in-display fingerprint sensor (210) to prompt a user to place certain portions of a fingerprint over the in-display fingerprint sensor, and the process may continue until enough fingerprint data units have been obtained to construct an acceptable fingerprint coverage map. In one or more embodiments disclosed herein, a fingerprint coverage map is a map that is assembled using various fingerprint data items obtained during a fingerprint enrollment process. Such assembly may occur via any process for collating image data to form a more comprehensive image. For example, an algorithm may be implemented to compare image data of fingerprint data units to determine which units include the same portion of a fingerprint, with the images being stitched together or otherwise combined to remove the overlapping same portion of the fingerprint data unit and extend the fingerprint coverage map to include a larger portion of the fingerprint. In one or more embodiments disclosed herein, a fingerprint enrollment procedure may further include determining where there are gaps in the fingerprint coverage map, and prompting a user to place a certain portion of a fingerprint over the in-display fingerprint sensor to help the coverage map reach a minimum threshold of completeness for use in post-enrollment fingerprint verification. Post-enrollment fingerprint verification may be performed for any reason. Examples of such reasons include, but are not limited to, unlocking an electronic device, causing a display screen of an electronic device to transition from a sleep state (e.g., the screen is off) to an active state (e.g., the screen is on), causing an electronic device to transition from a low power mode to a higher power mode, etc. A fingerprint enrollment process in accordance with one or more embodiments disclosed herein is discussed further in the description of FIGS. 3.1-7.5, below.

In one or more embodiments disclosed herein, the processing system (202) is also operatively connected to an operating system (208) (e.g., the operating system executes using the processing system). In one or more embodiments disclosed herein, an operating system (208) includes any software and/or firmware for managing the resources of one or more electronic devices (200). More specifically, the operating system (208) may be a program or set of programs that manages all or a portion of the hardware and other software (e.g., applications) in an electronic device (200).

Management of an electronic device by an operating system (208) may include scheduling, hardware allocation, application execution, network access, management of access to stored files that are selectively made available to applications running on the operating system, etc. An operating system (208) may also manage and enforce settings and permissions customized for specific applications running on the operating system (208). In one or more embodiments disclosed herein, the operating system (208) includes functionality to control the state of a display screen (204). For example, the operating system (208) may include, but is not limited to, functionality to turn on or off a display screen (204), increase or reduce power output to a display screen, adjust parameters (e.g., brightness) of a display screen, transition a display screen from an active state to an intermediate and/or sleep state, transition a display screen from a sleep and/or intermediate state to an active state, cause graphical elements to be displayed on the display screen, etc.

In one or more embodiments disclosed herein, the operating system (208) is operatively connected to a display screen (204). The display screen (204) may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device of FIG. 1 (i.e., input device (100)) and the display screen (204) may share physical elements. For example, some embodiments may utilize some of the same electrical components for displaying and sensing. In various embodiments, one or more display electrodes of a display device may be configured for both display updating and input sensing. As another example, the display screen may be operated in part or in total by the processing system (202) via the operating system (208). In one or more embodiments disclosed herein, the sensing region (206) is located at least partially overlapping the display screen (204), and at least a portion of the display screen is overlapped by the in-display fingerprint sensor (210).

While FIG. 2 shows a configuration of components, other configurations may be used without departing from the scope disclosed herein. For example, various components may be combined to create a single component. As another example, the functionality performed by a single component may be performed by two or more components. Accordingly, the embodiments disclosed herein should not be limited to the configuration of components shown in FIG. 2.

FIGS. 3.1-3.4 show an example finger with various portions of the fingerprint emphasized. The following example is for explanatory purposes only and not intended to limit the scope disclosed herein. Specifically, while FIGS. 3.1-3.4 show different fingerprint regions of a single finger, embodiments disclosed herein are applicable to any number of fingerprint portions of any number of fingers.

Turning to FIG. 3.1, FIG. 3.1 shows a finger (300) and a region of the finger referred to herein as a fingerprint pad (302). In one or more embodiments disclosed herein, the fingerprint pad (302) is the portion of the fingerprint substantially opposite the fingernail side of the finger (300), and the pad includes a center or core region of the fingerprint.

Turning to FIG. 3.2, FIG. 3.2 shows a finger (300) and a region of the finger referred to herein as a fingerprint tip (304). In one or more embodiments disclosed herein, the fingerprint tip (304) is the portion of the fingerprint that is above the fingerprint pad (302) of FIG. 3.1, but closer to the end of the finger than the fingerprint pad (302). The fingerprint tip (304) may partially overlap the fingerprint pad (302). In one or more embodiments disclosed herein, shapes of fingerprint portions may differ from one another by having a difference in size in at least one direction. For example, the fingerprint tip (304) shown in FIG. 3.2 is smaller in the vertical direction than the fingerprint pad (302) shown in FIG. 3.1

Turning to FIG. 3.3, FIG. 3.3 shows a finger (300) and a region of the finger referred to herein as a fingerprint tip side (306). In one or more embodiments disclosed herein, the fingerprint tip side (306) is the portion of the fingerprint that to the left or right of the fingerprint tip (304) of FIG. 3.2. The fingerprint tip side (306) may or partially overlap the fingerprint tip (304) and/or the fingerprint pad (302).

Turning to FIG. 3.4, FIG. 3.4 shows a finger (300) and a region of the finger referred to herein as a fingerprint side (308). In one or more embodiments disclosed herein, the fingerprint side (308) is the portion of the fingerprint that to the left or right of the fingerprint pad (302) of FIG. 3.1. The fingerprint side (308) may partially overlap the fingerprint tip (304), the fingerprint pad (302) and/or the fingerprint tip side (304). In one or more embodiments disclosed herein, both the fingerprint tip side in FIG. 3.3 and the fingerprint side in FIG. 3.4 show only one side of the finger. However, one having ordinary skill in the relevant art, and the benefit of this Detailed Description, will recognize that the finger has more than one side. For example, the fingerprint side shown in FIG. 3.4 may represent the left side of a fingerprint, while the right side (not shown) is on the other side of the finger. In one or more embodiments disclosed herein, during a fingerprint enrollment process, the shape displayed on the display screen may be a displayed leftward or rightward orientation (as shown, for example, in FIG. 4.3 and FIG. 4.4, below) and thereby prompt a user to place the corresponding left or right side of the finger on over the displayed shape. In one or more embodiments disclosed herein, displayed fingerprint shapes may be mirror images of one another (as shown, for example, in FIG. 4.3 and FIG. 4.4, below).

The regions of the fingerprint described above are merely exemplary, and other fingerprint portions may be within the scope disclosed herein. Moreover, each peripheral region (e.g., tip, tip side, side, etc.) of a fingerprint may be referred to as an edge portion of a fingerprint.

FIGS. 4.1-4.4 show an example of various shapes that may be displayed on a display screen at least partially over an in-display fingerprint sensor during a fingerprint enrollment process. The following example is for explanatory purposes and is not necessarily intended to limit the scope disclosed herein. Specifically, while FIGS. 4.1-4.4 show different shapes corresponding to different fingerprint portions of a single finger, embodiments disclosed herein are applicable to any number of shapes corresponding to any portion of any fingerprint. In one or more embodiments disclosed herein, fingerprint shapes displayed during a fingerprint enrollment process may be pre-determined shapes, and/or may adjusted or created during the enrollment process as needed Turning to FIG. 4.1, FIG. 4.1 shows a pad fingerprint shape (402). In one or more embodiments disclosed herein, the pad fingerprint shape (402) corresponds to a fingerprint pad (e.g., fingerprint pad (302) of FIG. 3.1), and display of the pad fingerprint shape (402) over an in-display fingerprint sensor (e.g., in-display fingerprint sensor (210) of FIG. 2) may prompt a user to place a fingerprint pad over the displayed pad fingerprint shape (402). In such embodiments, the user is so prompted because the fingerprint pad shape (402) is configured to mimic the shape of a fingerprint pad of a user engaging in a fingerprint enrollment process. Thus, in response to the display of the fingerprint pad shape, the user may place a fingerprint pad of their finger over the displayed shape, thereby creating a contact region with the display screen allowing capture of a desired portion of a fingerprint by an in-display fingerprint sensor.

Turning to FIG. 4.2, FIG. 4.2 shows a tip fingerprint shape (404). In one or more embodiments disclosed herein, the tip fingerprint shape (404) corresponds to a fingerprint tip (e.g., fingerprint tip 304 of FIG. 3.2), and display of the tip fingerprint shape (404) over an in-display fingerprint sensor (e.g., in-display fingerprint sensor (210) of FIG. 2) may prompt a user to place a fingerprint tip over the displayed tip fingerprint shape (404). In one or more embodiments disclosed herein, various displayed fingerprint shapes may differ in size in at least one dimension from other displayed fingerprint shapes during a fingerprint enrollment process. For example, the pad fingerprint shape (402) of FIG. 4.1 is, as shown, larger in the vertical direction than the tip fingerprint shape (404) shown in FIG. 4.2.

Turning to FIG. 4.3, FIG. 4.3 shows a right tip fingerprint shape (406) and a left tip fingerprint shape (408). In one or more embodiments disclosed herein, the right tip fingerprint shape (406) and/or the left tip fingerprint shape (408) may correspond to a fingerprint tip side (e.g., fingerprint tip side (306) of FIG. 3.3), and display of the right tip fingerprint shape (406) and/or the left tip fingerprint shape (408) over an in-display fingerprint sensor (e.g., in-display fingerprint sensor (210) of FIG. 2) may prompt a user to place a fingerprint tip side over the displayed right or left tip fingerprint shape (406, 408). In one or more embodiments disclosed herein, the right tip fingerprint shape (406) may be considered a rightward orientation while the left tip fingerprint shape (408) may be considered a leftward orientation. In one or more embodiments disclosed herein, the right tip fingerprint shape (406) and the left tip fingerprint shape (408) are mirror images of one another. In one or more embodiments disclosed herein, the size, shape, and/or orientation of displayed fingerprint shapes may differ from previously or subsequently displayed shapes. For example, right tip fingerprint shape (406) and left tip fingerprint shape (408) each differ in size, shape, and orientation from the pad fingerprint shape (402) shown in FIG. 4.1.

Turning to FIG. 4.4, FIG. 4.4 shows a left side fingerprint shape (410) and a right side fingerprint shape (412). In one or more embodiments disclosed herein, the left side fingerprint shape (410) and/or the right side fingerprint shape (412) may correspond to a fingerprint side (e.g., fingerprint side (308) of FIG. 3.4), and display of the left side fingerprint shape (410) and/or the right side fingerprint shape (412) over an in-display fingerprint sensor (e.g., in-display fingerprint sensor (210) of FIG. 2) may prompt a user to place a fingerprint side over the displayed left or right side fingerprint shape (410, 412). In one or more embodiments disclosed herein, the left side fingerprint shape (410) may be considered a leftward orientation while the right side fingerprint shape (412) may be considered a rightward orientation. In one or more embodiments disclosed herein, the left side fingerprint tip shape (410) and the right side fingerprint shape (412) are mirror images of one another.

In some embodiments, the size, orientation, and/or type of shape can be used to provide a target that implicitly guides the user to provide a particular desired portion of the fingerprint. For example, to guide the user to present an edge region of the fingerprint in a periphery of the fingerprint, a shape may be displayed having a smaller size, or one or more smaller dimensions than a displayed pad shape. Some implementations of this are shown in FIGS. 4.1-4.4, where the displayed pad fingerprint shape (402) is larger in one or more dimensions than the displayed edge shapes (e.g., the displayed tip fingerprint shape (404), the displayed side shapes (410, 412), and the displayed tip side shapes (406, 408).

As another example, to guide a user to provide a portion of the fingerprint on the left or right side of the fingerprint, different shapes may be displayed that are oriented towards the left or right, respectively. Some implementations of this are shown in FIGS. 4.3 and 4.4, where different shapes are oriented towards the left or right, corresponding to the left and right portions of the fingerprint, respectively.

Further, the desired portion of the fingerprint may be determined based on previously captured enrollment data or based on some predetermined sequence. For example, when the system determines that the tip region of the fingerprint is missing or incomplete from previously captured enrollment data, the system may display a shape corresponding to the tip. As another example, the system may display two or more different shapes (e.g., different sizes, different orientations, or different types) according to some sequence. The first displayed shape may correspond to a desired pad region of the fingerprint and a predetermined number of desired pad enrollment images may be captured while the first shape is displayed. Next, a second, different displayed shape may correspond to a desired edge region and a predetermined number of desired edge enrollment images may be captured while the second shape is displayed. The process may proceed similarly for any suitable number of predetermined steps.

The shapes described above and shown in the figures are merely exemplary, and other fingerprint shapes may be within the scope disclosed herein. Taken together, the various shapes may be used in any order, any number of times, and over any portion of an in-display fingerprint sensor during a fingerprint enrollment process to assist in obtaining a more complete fingerprint coverage map.

FIGS. 5.1-5.2 show an example of various placement locations of a pad fingerprint shape finger that may be displayed on a display screen at least partially over an in-display fingerprint sensor during a fingerprint enrollment process. The following example is for explanatory purposes and is not necessarily intended to limit the scope disclosed herein. Specifically, while FIGS. 5.1-5.2 show different shape locations on a display screen relative to an in-display fingerprint sensor, embodiments disclosed herein are applicable to any position of any shape corresponding to any portion of any fingerprint.

Turning to FIG. 5.1, FIG. 5.1 shows a pad fingerprint shape (500). In one or more embodiments disclosed herein, the pad fingerprint shape (500) corresponds to a fingerprint pad (e.g., fingerprint pad (302) of FIG. 3.1), and display of the pad fingerprint shape (500) over an in-display fingerprint sensor (e.g., in-display fingerprint sensor (210) of FIG. 2) may prompt a user to place a fingerprint pad over the displayed pad fingerprint shape (500). More specifically, as shown in FIG. 5.1, the in-display fingerprint sensor (502) includes a sensing area that is smaller than the pad fingerprint shape (500) and contained wholly within the displayed pad fingerprint shape. In such a scenario, the placement of the pad fingerprint shape (500) may cause a user to align a fingerprint with the pad fingerprint shape, thereby fully covering the in-display fingerprint sensor (502).

Turning to FIG. 5.2, FIG. 5.2 shows a pad fingerprint shape (500). In one or more embodiments disclosed herein, the pad fingerprint shape (500) corresponds to a fingerprint pad (e.g., fingerprint pad 302 of FIG. 3.1), and display of the pad fingerprint shape (500) over an in-display fingerprint sensor (e.g., in-display fingerprint sensor (210) of FIG. 2) may prompt a user to place a fingerprint pad over the displayed pad fingerprint shape (500). More specifically, as shown in FIG. 5.2, the in-display fingerprint sensor (502) includes a sensing area that is smaller than the pad fingerprint shape (500) and the pad fingerprint shape is displayed such that the in-display fingerprint sensor (502) is closer to the bottom of the pad fingerprint shape (500) and at least partially uncovered by the pad fingerprint shape. In such a scenario, the placement of the pad fingerprint shape (500) may cause a user to align a fingerprint with the pad fingerprint shape, thereby pacing a different portion of a fingerprint pad over the in-display fingerprint sensor (502).

The shape positions described above are merely exemplary, and other shape positions may be within the scope disclosed herein. Taken together, various positions of displayed fingerprint shapes relative to an in-display fingerprint sensor may be used in any order, any number of times, and over any portion of the in-display fingerprint sensor during a fingerprint enrollment process to assist in obtaining a more complete fingerprint coverage map.

Figure 6:
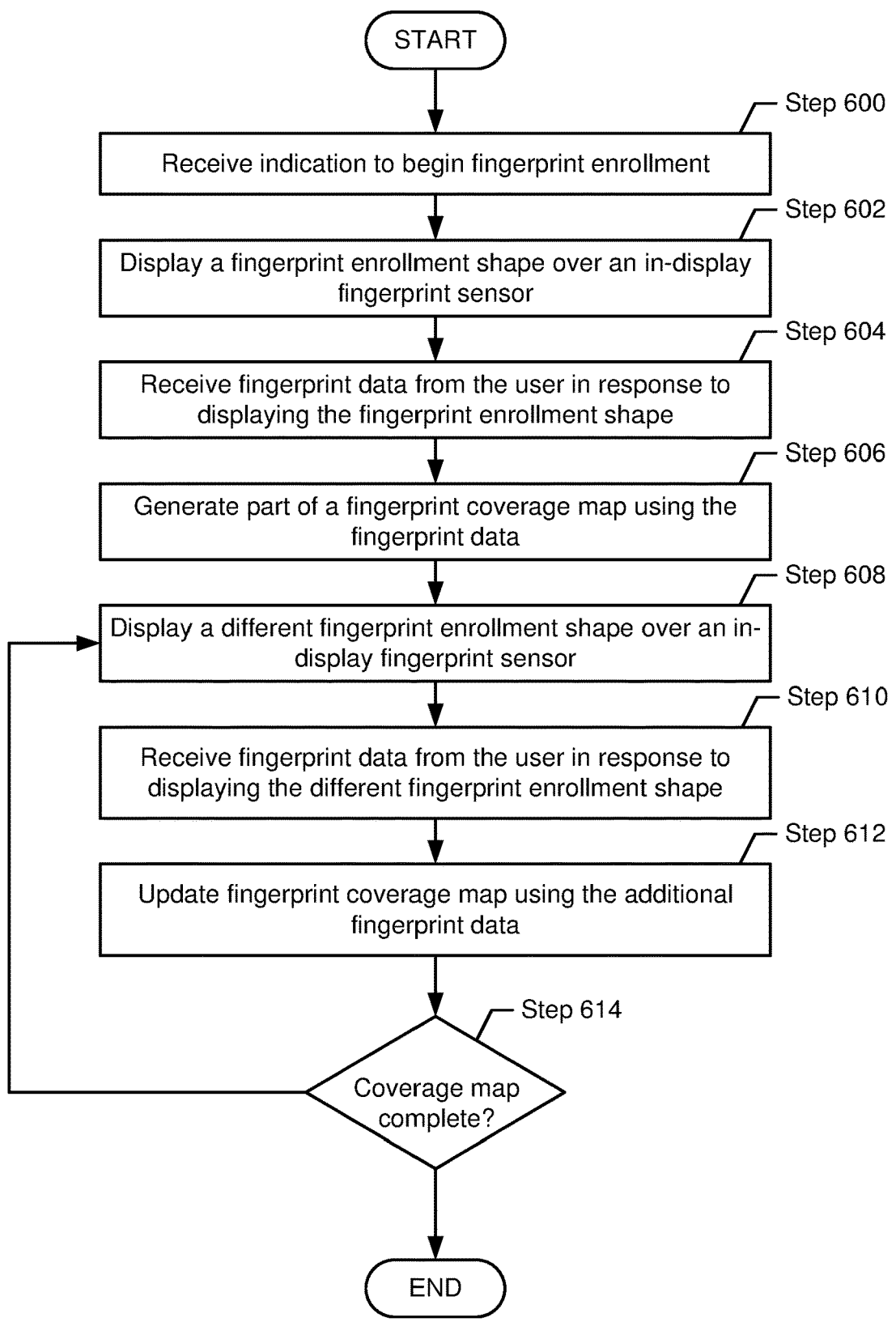
FIG. 6 shows a flowchart in accordance an embodiment disclosed herein.

FIG. 6 shows a flowchart in accordance with one or more embodiments disclosed herein. While the various steps in this flowchart are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments disclosed herein. By way of an example, determination steps may not require a processor to process an instruction unless an interrupt is received to signify that condition exists in accordance with one or more embodiments disclosed herein. As another example, determination steps may be performed by performing a test, such as checking a data value to test whether the value is consistent with the tested condition in accordance with one or more embodiments disclosed herein.

FIG. 6 shows a flowchart describing a method for fingerprint enrollment in accordance with one or more embodiments disclosed herein.

In Step 600, an indication is received that a fingerprint enrollment process is to begin. In one or more embodiments disclosed herein, the indication occurs automatically sometime after a user acquires an electronic device. In other embodiments disclosed herein, the user generates an indication by choosing to begin the fingerprint enrollment process. For example, the user may navigate to an application installed on the electronic device designed to implement a fingerprint enrollment process.

In Step 602, a fingerprint shape is displayed at least partially over an in-display fingerprint sensor of an electronic device. In one or more embodiments disclosed herein, the display of the shape may be caused by any scheme for displaying graphical elements on a display screen. For example, electrical current may be provided to some number of light emitting diodes serving as pixels of a display screen. The displayed fingerprint shape may be any shape corresponding to any portion of a fingerprint, and may be displayed in any location that at least partially overlaps an in-display fingerprint sensor.

In one or more embodiments disclosed herein, any one or more fingerprint shapes displayed during the fingerprint enrollment process are predetermined shapes. In one or more embodiments disclosed herein, any one or more fingerprint shapes displayed during the fingerprint enrollment process may be configured to mimic the shape of a contact region formed when a desired portion of a finger is in contact with an input surface, and any two finger portions may correspond to different portions of a finger.

In Step 604, fingerprint data is received from a user of the electronic device in response to the display of the fingerprint shape in Step 602. In one or more embodiments disclosed herein, the data is received because the user, upon seeing the displayed fingerprint shape, understands to interact with (e.g., touch, move finger close to) the fingerprint shape by placing their finger in a manner that substantially covers the displayed fingerprint shape. In one or more embodiments disclosed herein, the received fingerprint data is stored in a fingerprint data repository.

Additionally, although not shown in FIG. 6, the device may also determine the size and/or orientation of the fingerprint of the user in order to adjust future displayed fingerprint shapes to better match the size and/or preferred orientation of the finger of the user. For example, if the first displayed shape is determined to be much smaller than the fingerprint that is placed over the shape, the size of future displayed shapes may be increased to better correspond to the actual size of the fingerprint being enrolled. In one or more embodiments disclosed herein, in order to receive the fingerprint data, the fingerprint must remain over the displayed fingerprint shape for a certain length of time. In some embodiments, a cue (e.g., a haptic response, a visual cue, and audible output, etc.) may be provided to the user once the appropriate length of time has passed, letting the user know that the fingerprint data has been received.

In one or more embodiments disclosed herein, although not shown in FIG. 6, the displayed fingerprint shape may actually be a graphical element that undergoes a graphical element action when the user has interacted with the in-display fingerprint sensor properly (e.g., for a long enough time, by pressing with enough force, etc.) For example, the fingerprint shape may be displayed as a bubble, and when the user presses their fingerprint on the fingerprint shape with enough force as determined by a force sensor of the electronic device, the displayed bubble may undergo a graphical element action of the bubble bursting, which may or may not be accompanied by a haptic response provided by the user.

In Step 606, a portion of the fingerprint coverage map is generated using the received fingerprint data. In one or more embodiments disclosed herein, the received fingerprint data includes a partial image of a fingerprint of a user. As such, the first fingerprint data received for a given fingerprint during a fingerprint enrollment process may represent the beginning portion of the fingerprint coverage map, and include the portion of the fingerprint placed over the fingerprint shape and detected by the in-display fingerprint sensor.

In Step 608, a different fingerprint shape is displayed at least partially over the in-display fingerprint sensor. In one or more embodiments disclosed herein, the different fingerprint shape corresponds to a different portion of the fingerprint and is intended to prompt the user to use the different portion of the fingerprint by covering the new fingerprint shape. In one or more embodiments disclosed herein, the different fingerprint shape differs in one or more of size, shape, and orientation from the previously displayed fingerprint shape. For example, the different fingerprint shape may be made larger or smaller, or have an adjusted orientation. Such an adjustment may or may not be based on a fingerprint size or orientation (either of which may be estimated) detected during the receipt of fingerprint data in response to the previously displayed fingerprint shape.

In one or more embodiments disclosed herein, the different fingerprint shape is the same as a previously displayed fingerprint shape, but is in a different position relative to the in-display fingerprint sensor. In such an embodiment, the two locations may or may not overlap. In one or more embodiments disclosed herein, the display of the different fingerprint shape is preceded by a fingerprint transition animation where the previously displayed fingerprint shape appears to move as a finger goes into a position related to the new fingerprint shape (e.g., a finger rolling animation from a fingerprint pad shape to a fingerprint side shape).

In one or more embodiments, the different fingerprint shape differs in size in at least one dimension from a previously displayed fingerprint shape. In one or more embodiments, the different fingerprint shape may be displayed with a directional orientation that differs from the previously displayed fingerprint shape. For example, the previously displayed fingerprint shape may have been displayed with a rightward orientation, and thus the different fingerprint shape is displayed with a leftward orientation. In one or more embodiments disclosed herein, fingerprint shapes displayed during the enrollment process may be mirror images of one another.

In Step 610, additional fingerprint data is received from the user in response to displaying the different fingerprint shape. In one or more embodiments disclosed herein, the receipt of the additional fingerprint data is substantially similar to the receipt of the fingerprint data discussed in Step 604, above.

In Step 612, the fingerprint coverage map is updated using the additional fingerprint data received in Step 610. In one or more embodiments disclosed herein, the coverage map is updated by comparing the image of the portion of the fingerprint included in the additional fingerprint data with the image of previously received fingerprint data. If any portion is substantially the same, the coverage map may be updated by aligning the substantially same portions, thereby extending the coverage map to be a larger image or larger mosaic that incorporates the fingerprint data from the current, and all previous fingerprint data received during the enrollment of the fingerprint. In the event that no portion of the additional fingerprint data is substantially similar to any portion of any previously received fingerprint data, the additional fingerprint data can be stored separately and the process may continue until the additional fingerprint data can be incorporated into the coverage map via having a portion substantially similar to fingerprint data received later in the fingerprint enrollment process.

In Step 614, a determination is made as to whether the fingerprint coverage map is complete. In one or more embodiments disclosed herein, a coverage map may be considered complete when a pre-defined and/or configurable minimum threshold of fingerprint coverage has been achieved, or when a minimum number of enrollment images has been captured, or when a threshold amount of time has passed. If the coverage map is determined to be incomplete, the process returns to Step 608, and more fingerprint shapes are displayed, and new fingerprint data is received an incorporated into the fingerprint coverage map. Once the fingerprint coverage map is determined to be complete, the process ends and the relevant fingerprint may become an enrolled fingerprint for use in future fingerprint verifications.

FIGS. 7.1-7.5 show an example electronic device, smart phone (700), having a display screen (704), a sensing region (706), and an in-display fingerprint sensor (not shown, as the user may not see the sensor) in accordance with one or more embodiments disclosed herein. The following example is for explanatory purposes and is not necessarily intended to limit the scope disclosed herein.

Turning to FIG. 7.1, consider a scenario in which a user has elected to begin a fingerprint enrollment process for a recently acquired smart phone (700). The user provides an indication to begin the process by navigating to an enrollment application (not shown) provided as part of the smart phone (700) software. In response to the indication, the smart phone (700) displays a pad fingerprint shape graphical element (708) centered over an in-display fingerprint sensor (not shown) within the sensing region (706) overlapping the display screen (704). The pad fingerprint shape graphical element (708) appears as a bubble similar to the appearance of bubble wrap. Prompted by the shape, and a desire to pop the bubble, the user places an index finger over the pad fingerprint shape graphical element by placing a fingerprint pad to better cover the shape, and also presses until a force threshold is reached, as detected by a force sensor (not shown) until the pad fingerprint shape graphical element undergoes the graphical interface action (i.e., a graphical element action) of appearing to pop, accompanied by a haptic actuation by a haptic actuator providing haptic feedback to the user. The graphical element action indicates successful receipt of the fingerprint data corresponding to the fingerprint pad of the finger of the user, as well as the beginning of the fingerprint coverage map.

Next, as shown in FIG. 7.2, a tip fingerprint shape graphical element (710) is displayed in the sensing region (706) of the display screen (704). This prompts the user to place the fingerprint tip portion of the fingerprint being enrolled over the shape, and, again, the tip fingerprint shape graphical element appears as a bubble, prompting the user to press harder until the bubble pops, and haptic feedback is received. Then the received fingerprint data is compared with the previously received fingerprint data, and it is determined that a portion of the fingerprint data received in response to the display of the pad fingerprint shape graphical element and a portion of the fingerprint data received in response to the display of the tip fingerprint shape graphical element include an image of the same portion of the fingerprint. The two fingerprint data units are stitched together to form a larger image or mosaicked together to form a larger representation of more of the fingerprint, thereby increasing the coverage of the fingerprint coverage map.

FIG. 7.3 shows the process continuing in substantially the same manner, displaying a left side fingerprint shape graphical element (712) to prompt receipt of additional fingerprint data to further expand the fingerprint coverage map.

FIG. 7.4 shows the process continuing in substantially the same manner, displaying a right side fingerprint shape graphical element (714) to prompt receipt of additional fingerprint data to further expand the fingerprint coverage map.

Next, a determination is made that the fingerprint coverage map has a gap near the lower portion of the fingerprint pad. Therefore, as shown in FIG. 7.5, the pad fingerprint shape graphical element (708) first shown at the beginning of the enrollment process in FIG. 7.1 is displayed again, but with the position of the shape translated relative to the in-display fingerprint sensor to prompt the user to place a different portion of the fingerprint pad over the sensor.

While various embodiments disclosed herein been described, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for in-display fingerprint enrollment, the method comprising:
   receiving an indication to begin a fingerprint enrollment process on an electronic device comprising an in-display fingerprint sensor;
   displaying, via a display screen of the electronic device, a first fingerprint enrollment shape displayed at over the in-display fingerprint sensor of the electronic device;
   receiving from a user, in response to displaying the first fingerprint enrollment shape and via a first user interaction with a sensing region overlapping the display screen of the electronic device, a first portion of fingerprint data corresponding to a fingerprint of the user;
   generating, in part, a fingerprint coverage map corresponding to the fingerprint using the first portion of the fingerprint data;
   displaying, via the display screen of the electronic device, a second fingerprint enrollment shape displayed over the in-display fingerprint sensor;
   receiving from the user, in response to displaying the second fingerprint enrollment shape and via a second user interaction with the sensing region, a second portion of fingerprint data corresponding to the fingerprint; and
   updating the fingerprint coverage map corresponding to the fingerprint using the second portion of the fingerprint data.

2. The method of claim 1, wherein the first fingerprint enrollment shape corresponds to a pad fingerprint shape and the second fingerprint enrollment shape corresponds to a tip fingerprint shape.

3. The method of claim 1, further comprising:
   making a determination, after updating the fingerprint coverage map, that the fingerprint coverage map is incomplete;
   displaying, based on the determination and via the display screen of the electronic device, an additional fingerprint enrollment shape;
   receiving from the user, in response to displaying the additional fingerprint enrollment shape and via a third user interaction with the sensing region, a third portion of fingerprint data corresponding to the fingerprint; and
   updating the fingerprint coverage map corresponding to the fingerprint using the third portion of the fingerprint data.

4. The method of claim 1, wherein the second fingerprint enrollment shape is displayed at a different location over the in-display fingerprint sensor from the first fingerprint enrollment shape.

5. The method of claim 1, further comprising:
detecting, after displaying the first fingerprint enrollment shape, an estimated size of the fingerprint; and
adjusting, based on the estimated size of the fingerprint, a size of the second fingerprint enrollment shape before displaying the second fingerprint enrollment shape.

6. The method of claim 1, further comprising:
detecting, after displaying the first fingerprint enrollment shape, an estimated orientation of the fingerprint; and
adjusting, based on the estimated orientation of the fingerprint, an orientation of the second fingerprint enrollment shape before displaying the second fingerprint enrollment shape.

7. The method of claim 1, wherein the first fingerprint enrollment shape is displayed over at least a portion of a force sensor, the method further comprising:
prompting the user to press the finger on the first fingerprint enrollment shape to cause a graphical element action;
displaying the graphical element action once the press from the user reaches a predetermined force threshold sensed by the force sensor; and
generating a haptic response while the graphical element action is displayed and after the predetermined force threshold is reached.

8. The method of claim 1, wherein displaying the second fingerprint enrollment shape after displaying the first fingerprint enrollment shape comprises displaying a fingerprint transition animation to transition from the first fingerprint enrollment shape to the second fingerprint enrollment shape.

9. The method of claim 1, wherein the second fingerprint enrollment shape displayed over the in-display fingerprint sensor has a size difference in at least one dimension from the first fingerprint enrollment shape displayed over the in-display fingerprint sensor.

10. The method of claim 1, wherein the first fingerprint enrollment shape is displayed over the in-display fingerprint sensor with one of a leftward and rightward orientation, and wherein the second fingerprint enrollment shape is displayed over the in-display fingerprint sensor with the other of the leftward and rightward orientation.

11. The method of claim 10, wherein the first fingerprint enrollment shape and the second fingerprint enrollment shape are mirror images of each other.

12. The method of claim 1, wherein the first fingerprint enrollment shape is displayed in a first area of the display screen, wherein the second fingerprint enrollment shape is displayed in a second area of the display screen, and wherein the first area and the second area at least partially overlap each other.

13. The method of claim 12, wherein the first fingerprint enrollment shape and the second fingerprint enrollment shape differ in at least one of size, type, and orientation from each other.

14. The method of claim 1, wherein the first fingerprint enrollment shape is configured to mimic the shape of a first contact region formed when a first desired portion of a finger is in contact with an input surface, and wherein the second fingerprint enrollment shape is configured to mimic the shape of a second contact region formed when a second desired portion of the finger is in contact with the input surface, wherein the first desired portion corresponds to a different part of the finger from the second desired portion.

15. The method of claim 14, wherein the first fingerprint enrollment shape and the second fingerprint enrollment shape are predetermined.

16. An electronic device comprising:
an in-display fingerprint sensor located within a sensing region overlapping a display screen of the electronic device, coupled to a processing system, and configured to receive fingerprint data via a plurality of user interactions with the sensing region of the electronic device;
a fingerprint data repository coupled to a processing system and configured to store the fingerprint data and a fingerprint coverage map;
the display screen coupled to the processing system and configured to:
display a first fingerprint enrollment shape displayed over the in-display fingerprint sensor of the electronic device; and
display a second fingerprint enrollment shape displayed over the in-display fingerprint sensor; and
the processing system configured to:
receive an indication to begin a fingerprint enrollment process on the electronic device;
receive from a user, in response to the display of the first fingerprint enrollment shape and via a first user interaction of the plurality of user interactions, a first portion of the fingerprint data corresponding to a fingerprint of the user;
generate, in part, the fingerprint coverage map corresponding to the fingerprint using the first portion of the fingerprint data;
receive from the user, in response to the display of the second fingerprint enrollment shape and via a second user interaction of the plurality of user interactions, a second portion of fingerprint data corresponding to the fingerprint; and
update the fingerprint coverage map corresponding to the fingerprint using the second portion of the fingerprint data.

17. The electronic device of claim 16, wherein the first fingerprint enrollment shape corresponds to a pad fingerprint shape and the second fingerprint enrollment shape corresponds to a tip fingerprint shape.

18. The electronic device of claim 16, wherein:
the processing system is further configured to:
make a determination, after updating the fingerprint coverage map, that the fingerprint coverage map is incomplete;
receive from the user, in response to displaying an additional fingerprint enrollment shape on the display screen and via a third user interaction of the plurality of user interactions, a third portion of fingerprint data corresponding to the fingerprint; and
update the fingerprint coverage map corresponding to the finger using the third portion of the fingerprint data; and
the display screen is further configured to display the additional fingerprint enrollment shape.

19. The electronic device of claim 16, wherein the second fingerprint enrollment shape displayed over the in-display fingerprint sensor has a size difference in at least one dimension from the first fingerprint enrollment shape displayed over the in-display fingerprint sensor.

20. The electronic device of claim 16, wherein the first fingerprint enrollment shape is displayed over the in-display fingerprint sensor with one of a leftward and rightward orientation, and wherein the second fingerprint enrollment shape is displayed over the in-display fingerprint sensor with the other of the leftward and rightward orientation.

21. The electronic device of claim 16, wherein the first fingerprint enrollment shape is displayed in a first area of the display screen, wherein the second fingerprint enrollment shape is displayed in a second area of the display screen, and wherein the first area and the second area at least partially overlap each other.

22. The electronic device of claim 16, wherein the first fingerprint enrollment shape is configured to mimic the shape of a first contact region formed when a first desired portion of a finger is in contact with an input surface, and wherein the second fingerprint enrollment shape is configured to mimic the shape of a second contact region formed when a second desired portion of the finger is in contact with the input surface, wherein the first desired portion corresponds to a different part of the finger from the second desired portion.

23. The electronic device of claim 16, further comprising:
   a force sensor coupled to the processing system, located at least partially overlapping the in-display fingerprint sensor, and configured to detect when a force applied to the force sensor reaches a predetermined force threshold;
   a haptic actuator coupled to the processing system and configured to provide a haptic response for the user;
   wherein:
   the processing system is further configured to:
      prompt the user to press a finger corresponding to the fingerprint on the first fingerprint enrollment shape to cause a graphical element action; and
      generate the haptic response via the haptic actuator while the graphical element action is displayed; and
   the display screen is further configured to display the graphical element action once the press from the user reaches the predetermined force threshold sensed by the force sensor.

24. A non-transitory computer readable medium comprising instructions that, when executed by a computer processor, perform a method comprising:
   receiving an indication to begin a fingerprint enrollment process on an electronic device comprising an in-display fingerprint sensor;
   displaying, via a display screen of the electronic device, a first fingerprint enrollment shape displayed over the in-display fingerprint sensor of the electronic device;
   receiving from a user, in response to displaying the first fingerprint enrollment shape and via a first user interaction with a sensing region overlapping the display screen of the electronic device, a first portion of fingerprint data corresponding to a fingerprint of the user;
   generating, in part, a fingerprint coverage map corresponding to the fingerprint using the first portion of the fingerprint data;
   displaying, via the display screen of the electronic device, a second fingerprint enrollment shape displayed over the in-display fingerprint sensor;
   receiving from the user, in response to displaying the second fingerprint enrollment shape and via a second user interaction with the sensing region, a second portion of fingerprint data corresponding to the fingerprint; and
   updating the fingerprint coverage map corresponding to the fingerprint using the second portion of the fingerprint data.

* * * * *